Patented Apr. 28, 1925.

1,535,963

UNITED STATES PATENT OFFICE.

WELLINGTON LEE TANNER, OF CLEVELAND, OHIO, ASSIGNOR TO THE GRASSELLI CHEMICAL COMPANY, OF CLEVELAND, OHIO, A CORPORATION OF OHIO.

ACCELERATOR FOR RUBBER VULCANIZATION.

No Drawing. Application filed July 29, 1924. Serial No. 728,961.

*To all whom it may concern:*

Be it known that I, WELLINGTON LEE TANNER, a citizen of the United States, residing at Cleveland, in the county of Cuyahoga and State of Ohio, have invented certain new and useful Improvements in Accelerators for Rubber Vulcanization, of which the following is a specification.

This invention relates to a process for the vulcanization of rubber involving the use of so-called vulcanization accelerators.

I have found that the halogen alkylamines such as for instance dichlor methylamine and dichlor ethylamine or mixtures thereof, may be made to serve as rubber vulcanization accelerators.

The mix to be vulcanized in which the accelerating agents referred to may be employed may contain in addition to rubber and sulfur, fillers such as zinc oxide, lithopone, carbon black, tripoli, etc.

The use of the halogenated alkylamines as accelerators for rubber vulcanization is illustrated in the following example.

A rubber mix containing 10% of powdered sulfur, 10% of zinc oxide, 2% of dichlor methylamine and the remainder rubber serum (coagulated latex) was homogenized by means of rolls at room temperature. Test pieces of this mix were vulcanized under different steam pressures. The products possessed properties superior in tensile and other stress strengths to check test pieces made from similar mixes in which the dichlor methlyamine was omitted, and replaced by other substances such as hexamethylenetetramine nitrosodimethylaniline base, etc.

In the comparative tests referred to in the foregoing example, the halogenated alkylamines were found to give results superior to other accelerating agents under similar conditions. By comparison it was found that about 2% of the dichlor methylamine gave results substantially equal to about 5% of hexamethylenetetramine.

Tests similar to that described in the foregoing example were also made in which crude dichlor methylamine containing substantial quantities of other of the halogenated alkylamines was used with similar results.

These compounds possess certain valuable characteristics as agents for rubber vulcanization acceleration, particularly in that they are not dissociated or appreciably ionized upon exposure to moisture. The compounds may be stored without danger of decomposition and incorporated in a moist rubber mix to be vulcanized and allowed to stand without decomposition and consequent loss of accelerating value. This characteristic of the halogenated alkylamines, i. e. stability against moisture, is particularly valuable in their use as accelerators in the vulcanization of raw latex which contains water.

The halogenated alkylamines possess the further advantage that they, excepting the lower members, are liquids, and are therefore readily incorporated in the rubber mix, assisting to some extent the working thereof. As is indicated in the foregoing example, the accelerating agent may be incorporated in the mix at room temperature due in part to the softening action upon the mix of the relatively small amount of the accelerating agent present.

It is of course understood that my invention is not limited to the use of the particular halogenated alkylamines or to the proportions thereof to the other constituents of the rubber mixture or to the use of a mixture of the particular ingredients or the proportions thereof or to the specific procedure described in the foregoing illustrative example.

The invention embraces the use in the vulcanization of rubber of the various halogenated alkylamines, either singly or mixtures of two or more of them, halogenated alkylamines of course including the primary, secondary, tertiary and quaternary amines of the various alkyl groups in which one or more of the alkyl hydrogens are substituted by any one or more of the halogens.

I claim:—

1. Process which comprises vulcanizing rubber in the presence of a halogenated alkylamine.

2. Process of vulcanizing rubber which comprises mixing rubber with sulfur and a halogenated alkylamine and subjecting the mixture to a vulcanizing temperature.

3. Process of vulcanizing rubber which comprises mixing rubber with sulfur, a filler and a halogenated alkylamine and subjecting the mixture to a vulcanizing temperature.

4. Process which comprises vulcanizing rubber in the presence of dichlor methylamine.

5. Process of vulcanizing rubber which comprises mixing rubber with sulfur, a filler, and dichlor methylamine and subjecting the mixture to a vulcanizing temperature.

6. Process of vulcanizing rubber which comprises mixing rubber with sulfur, zinc oxide and dichlor methylamine and subjecting the mixture to a vulcanizing temperature.

7. Process of vulcanizing rubber which comprises mixing rubber serum with about 10% of zinc oxide, 10% of sulfur and 2% of dichlor methylamine at ordinary temperature and subjecting the mixture to a vulcanizing temperature.

8. Process which comprises vulcanizing rubber admixed with a plurality of halogenated alkylamines.

9. In the vulcanization of rubber with sulfur the use as vulcanization accelerators of the halogenated alkylamines.

10. A rubber vulcanization accelerator comprising a halogenated alkylamine.

In testimony whereof, I affix my signature.

WELLINGTON LEE TANNER.